United States Patent [19]
Maekawa et al.

[11] 3,722,369
[45] Mar. 27, 1973

[54] FLUID POWER STEERING GEAR

[75] Inventors: Tadashi Maekawa; Akira Suzuki; Shigenori Haramura, all of Kariya, Japan

[73] Assignee: Aisin Seiki Kabushiki Kaisha, Aichiken, Japan

[22] Filed: Feb. 12, 1971

[21] Appl. No.: 114,864

[52] U.S. Cl. .................91/380, 91/422, 91/465, 92/116
[51] Int. Cl. .................................F15b 9/0
[58] Field of Search.......91/422, 431, 465, 370, 380, 91/371, 372, 373, 374, 376, 378; 180/79.2

[56] References Cited

UNITED STATES PATENTS

| | | |
|---|---|---|
| 2,755,778 | 7/1956 | Loofbourrow et al............91/431 |
| 3,010,335 | 11/1961 | Foerster et al. ..................91/380 |
| 3,070,072 | 12/1962 | Folkerts .........................91/370 |
| 3,180,233 | 4/1965 | Jablonsky........................91/465 |

*Primary Examiner*—Paul E. Maslousky
*Attorney*—Holman & Stern

[57] ABSTRACT

A fluid power steering gear is comprised of a piston installed in a cylinder and defining a pair of opposed fluid chambers therewithin, the piston being formed with rack teeth which are in mesh with the teeth of a gear sector linked to the front wheels of a motor vehicle. A steering nut is rotatably confined in this piston and is operably connected, via a plurality of endlessly recirculating balls, to a steering shaft. A pair of control valve means, respectively in communication with the aforesaid opposed fluid chambers on both sides of the piston, are also installed in the piston so as to be respectively operated by means of pins secured eccentrically to the end face of the steering nut, thereby to interrelatedly control fluid flow to and from the fluid chambers. A safety device for operation in the event of a malfunction of the fluid power steering gear is also provided.

8 Claims, 4 Drawing Figures

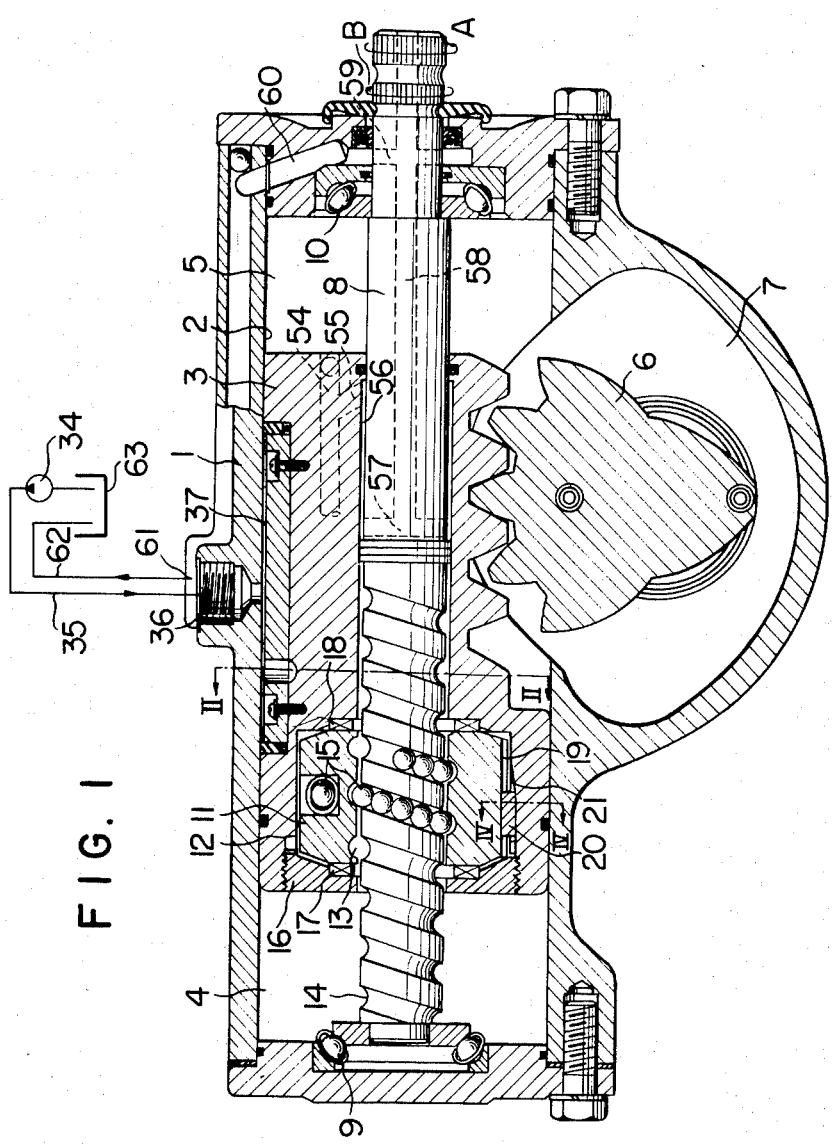
FIG. I

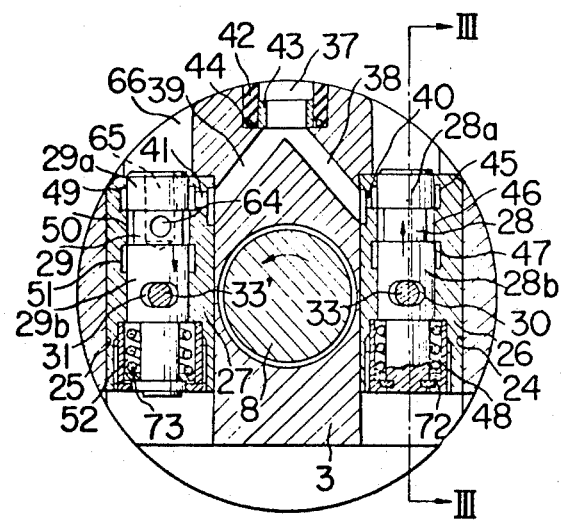
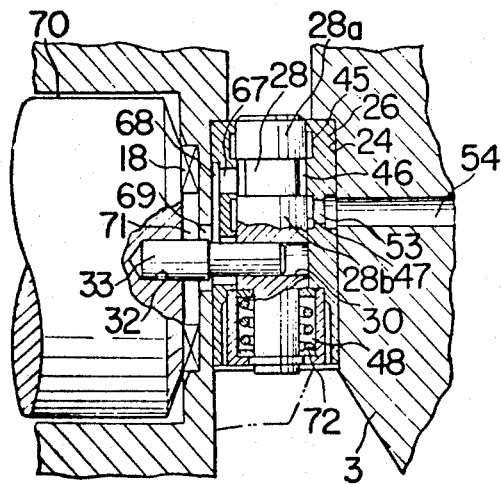
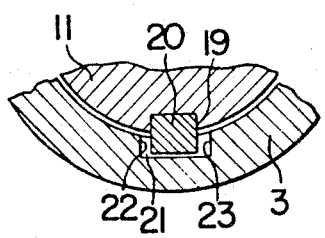

FLUID POWER STEERING GEAR

BACKGROUND OF THE INVENTION

This invention relates generally to fluid power steering, and in particular to a new and improved "integral" fluid power steering gear for particular use in motor vehicles, wherein a pair of control valve means are accommodated in a piston within a cylinder housing the steering gear proper.

There have been proposed various types of such integral steering gear, e.g., those having their power mechanism built into the same housing as the steering gear proper. In spite of their many manifested advantages, those conventionally available integral steering gears have had a serious disadvantage arising from their bulky size when they are to be installed in a limited space available therefor within present day motor vehicles which are packed with a growing number of components for accessories. Today's demand for smaller sized integral steering gears has not been fully fulfilled by the prior art, as far as we are aware, without the slightest sacrifice in operating efficiency or manufacturing costs.

SUMMARY OF THE INVENTION

It is accordingly a principal object of the present invention to provide an improved integral fluid power steering gear which is greatly reduced in size and which operates with high efficiency.

Another object of the invention is to provide a fluid power steering gear in which a pair of control valve means are accommodated in a piston within a cylinder housing the steering gear proper, thus resulting in great reduction in the overall length of the cylinder.

Still another object of the invention is to provide a fluid power steering gear in which the inner sleeve members of a pair of control valves accommodated in a piston are operated directly by the rotation of a steering nut also confined in the piston, the inner sleeve members so operated correspondingly controlling fluid flow to and from fluid chambers on both sides of the piston within the cylinder, so that the force applied at the motor vehicle steering wheel by an operator is faithfully responded to by its front wheels.

A further object of the invention is to provide a fluid power steering gear equipped with a simple but positive safety device whereby the motor vehicle can be steered safely even in the event of damage or some other trouble that may be caused in the hydraulic circuit of the steering gear.

With these objects in view and the other objects hereinafter set forth, the present invention will now be described in greater detail in terms of a preferred embodiment thereof illustrated in the accompanying drawings, throughout which like reference numerals indicate like parts.

BRIEF DESCRIPTION OF THE DRAWINGS

In the drawings:

FIG. 1 is a longitudinal sectional view of a fluid power steering gear in accordance with the present invention;

FIG. 2 is a cross sectional view of the fluid power steering gear of FIG. 1, taken along line II—II therein, the view looking in the direction of the arrows;

FIG. 3 is a fragmentary sectional view taken along the line III—III in FIG. 2, the view looking in the direction of the arrows; and FIG. 4 is a fragmentary sectional view taken along the line IV-IV in FIG. 1, the view looking in the direction of the arrows.

DETAILED DESCRIPTION OF THE INVENTION

Referring now to the drawings, and first of all to FIG. 1 in particular, wherein is shown a preferred form of the fluid power steering gear in accordance with the present invention, the reference numeral 1 generally designates a cylinder housing the fluid power steering gear proper. In a circular bore 2 of this cylinder 1, there is slidably installed a piston 3 defining a left hand fluid chamber 4 and a right hand fluid chamber 5. A gear sector 6, positioned in a space 7 in communication with the right hand fluid chamber 5, is connected to the front wheels (not shown) of the motor vehicle through a pitman arm and a steering linkage system on one hand and, on the other, is in mesh with rack teeth formed on part of the aforesaid piston 3. A steering shaft 8 is connected to a steering wheel (not shown) of the motor vehicle and is itself installed lengthwise in the cylinder 1 so as to extend through the piston 3. Bearings 9 and 10 support this steering shaft 8 so as to permit its s smooth rotation and yet to prevent its axial movement.

A steering nut 11 is accommodated in a bore 12 near the left hand end of the piston 3, with some play permitted in its radial direction, and is engaged with the steering shaft 8 via a plurality of endlessly recirculating balls 15 interposed between a helical groove 13 on the inner surface of the steering nut 11 and a corresponding helical groove 14 on the periphery of the left hand side of the steering shaft 8. This steering nut 11 is supported by bearings 17 and 18 so as to be rotatable but to be prevented from axial movement, and its rotational resistance is made regulatable by means of a lock screw 16 screwed into the left hand end of the piston 3.

As illustrated in FIG. 1 and, in greater detail, in FIG. 4, a keyway 19 is cut axially on the lower end of the steering nut 11, with a key 20 being securely received by this keyway 19. This key 20 protrudes into a keyway 21 cut correspondingly at the bottom of a bored (12) interior of the piston 3, with substantially equal spacings between the key 20 and shoulders 22 and 23 of the keyway 21. This is to permit vehicle steering solely by the force applied manually at the steering wheel (not shown) in the event of some trouble caused especially in the hydraulic circuit of the fluid power steering gear, as still to be described in greater detail.

As illustrated specifically in FIGS. 2 and 3, the piston 3 is provided with a pair of bores 24 and 25 which are disposed symmetrically with respect to the axis of this piston 3 and in a plane at right angles thereto. Within these bores 24 and 25 there are fixedly confined outer valve sleeve members 26 and 27, respectively, in which are slidably received inner valve sleeve members 28 and 29, respectively. Formed at the central portions of these inner sleeve members 28 and 29 are elongated holes 30 and 31, respectively, with which are respectively engaged pins 33 and 33' secured at the other end to a pair of bores 32 and 32' (the bore 32' being not shown in the drawings) formed eccentrically at the end of the steering nut 11. Hence, the inner sleeve members 28 and 29 are made by the rotation of this steering nut 11 to slide up and down in the opposite directions and in parallel with each other in a plane at right angles to the steering shaft 8.

Proceeding now to the description of a hydraulic circuit of this fluid power steering gear, the reference numeral 34 in FIG. 1 indicates a source of pressure fluid (e.g., a pump) located outside of the cylinder 1 enclosing the fluid power steering gear proper. This source 34 of pressure fluid is communicated via a passage 35 with a connector 36 to the power steering gear proper, with the connector 36 being in communication with a groove 37 extending axially on the periphery of the piston 3 over a length substantially equal to the stroke of this piston 3. Further, as illustrated in FIG. 2, the connector 36 is communicated via passages 38 and 39, bifurcated from the axial groove 37, with ports 40 and 41 running in the radial direction of the outer sleeve members 26 and 27, respectively. A seal member 42 is positioned in the axial groove 37 on the periphery of the piston 3 and is kept in place by means of a holding member 43. Aided by a ring 44, this seal member 42 adequately prevents the leakage of the fluid being fed under pressure into the left hand fluid chamber 4 and the right hand fluid chamber 5.

Between the outer sleeve member 26 and the inner sleeve member 28 together with its lands 28a and 28b, there are provided annular chambers 45, 46, 47 and 48. Similarly, between the other outer sleeve member 27 and the other inner sleeve member 29 together with its lands 29a and 29b, there are provided annular chambers 49, 50, 51 and 52. Of all these annular chambers, the chambers 45 and 49 are respectively in communication with the aforesaid ports 40 and 41 running in the radial direction of the outer sleeve members 26 and 27. The chambers 47 and 51 are in communication with a reservoir 63 via passages 53 and 53' (the passage 53' being not shown in the drawings) extending radially through the outer sleeve members 26 and 27, a passage 54 extending axially through the piston 3, a passage 55 extending obliquely through the piston 3, an annular passage 56 between the piston 3 and the steering shaft 8, a passage 57 extending diametrically through the steering shaft 8, a passage 58 extending axially through the steering shaft 8, a passage 59 extending diametrically through steering shaft 8, a passage 60 provided to the cylinder 1 housing the steering gear proper, connector 61 and a passage 62 outside of the cylinder 1, as illustrated in FIGS. 1, 2 and 3.

In order to make watertight all of the aforementioned passages as well as the left hand fluid chamber 4 and the right hand fluid chamber 5, there are provided seal members wherever necessary. Further, the annular chamber 50 is in communication with the right hand fluid chamber 5 via a port 64 extending diametrically through the inner sleeve member 29, a passage 65 extending axially through the same inner sleeve member 29 and a hole 66 formed in the piston 3 and opened to the space 7, as illustrated in FIG. 2 in particular. The annular chamber 46 is in communication with the left hand fluid chamber 4 via a port 67 extending radially through the outer sleeve member 26, a slot 68 formed on the periphery of the same, a hole 69 open to the bore 12 of the piston 3, a groove 71, and finally through an annular passage 70 between the steering nut 11 and the piston 3, as best illustrated in FIGS. 1 and 3.

Being of the so-called "open center" type, the annular chambers 45 and 46, the annular chambers 46 and 47, the annular chambers 49 and 50, and the annular chambers 50 and 51 are respectively in communication with each other when the inner sleeve members 28 and 29 are kept in their neutral or centered position by means of spring members 72 and 73 accommodated in their respective annular chambers 48 and 52.

In the above described construction of the preferred form of the fluid power steering gear in accordance with the present invention, when the motor vehicle is running straight ahead, the open center type inner sleeve members 28 and 29 intercommunicate all the fluid paths associated therewith. Accordingly, the fluid fed under pressure from the source 34 is supplied via the passage 35, the connector 36, the axial groove 37 on the periphery of the piston 3 and the passages 38 and 39 bifurcated therefrom, to the ports 40 and 41 extending in the radial direction of the outer sleeve members 26 and 27, respectively. Further from these radial ports 40 and 41, the fluid is fed to the left hand fluid chamber 4 and the right hand fluid chamber 5 via the annular chambers 45 and 49, the spaces opened slightly by the lands 28a and 29a of the inner sleeve members 28 and 29, and the annular chambers 46 and 50, respectively. In this instance, however, the pressures thus produced in the left hand fluid chamber 4 and the right hand fluid chamber 5 are equalized, so that no thrust is caused to the piston 3. Consequently, the fluid in the annular chambers 46 and 50 is fed through the spaces opened slightly by the lands 28b and 29b of the inner sleeve members 28 and 29 to the annular chambers 47 and 51, respectively, and thence to the reservoir 63 through the discharge path mentioned already.

It will now be supposed that the steering shaft 8 is rotated in the direction of the arrow A in FIG. 1 by an operator at the motor vehicle steering wheel. Then the gear sector 6, connected to the front wheels of the motor vehicle through a pitman arm and a steering linkage mechanism, is prevented from rotating because of the road surface resistance experienced by the front wheels, thereby inhibiting the movement of the piston 3. Hence the steering nut 11 rotates together with the steering shaft 8. Since the pins 33 and 33' secured eccentrically to the end of the steering nut 11 are in engagement with the elongated holes 30 and 31 formed at the central portions of the inner sleeve members 28 and 29, respectively, these inner sleeve members 28 and 29 are axially displaced against the force of the springs 73 and 74 due to the rotation of the steering nut 11.

More specifically, with reference to FIG. 2, the inner sleeve member 28 moves upward while the other inner sleeve member 29 moves downward, as indicated by the arrows in the drawing, so that their lands 28a and 29b open the annular chambers while their lands 28b and 29a close the annular chambers associated respectively therewith. The fluid being fed under pressure as described above thus flows into the annular chambers 45 and 49 via the radial ports 40 and 41 of the outer sleeve members 26 and 27, respectively, and thence into the annular chamber 46 alone past the land 28a of the inner sleeve member 28 because the annular chamber 50 below the aforesaid annular chamber 49 is closed by the land 29a of the inner sleeve member 29. Further from this annular chamber 46, the fluid is fed under pressure into the left hand fluid chamber 4 via the radial port 67 of the outer sleeve member 26, the slot 68 formed on the periphery of the same, the hole 69 open to the bore 12 of the piston 3, the groove 71 and the annular passage 70 between the steering nut 11 and the piston 3, and thence to the chamber, as illustrated in FIG. 3. Hence the piston 3 is thrusted in the right hand direction in FIG. 1.

Succeedingly, the fluid that has been present in the right hand fluid chamber 5 is forced through the hole 66 open to the space 7 in communication with that right hand fluid chamber 5, the passage 65 extending in the axial direction of the inner sleeve member 29, and the port 64 extending diametrically through the same inner sleeve member 29, into the annular chamber 50, and thence into the annular chamber 51 therebelow via the space opened by the land 29b of the downwardly displaced inner sleeve member 29. The fluid in the right hand fluid chamber 5 is thus fed back to the reservoir 63 of FIG. 1 through the ensuing discharge path mentioned already.

The piston 3 thrusted in the right hand direction in FIG. 1 as described above causes the gear sector 6 to turn clockwise in the drawing, so that the motor vehicle is steered as its front wheels, connected with this gear sector 6 through the pitman arm, etc., are turned correspondingly. The inner sleeve members 28 and 29 are succeedingly returned to their neutral or centered position upon cessation of the application of turning effort at the steering wheel.

A turn of the motor vehicle in the other direction is effected through the reversal of the foregoing action, with the steering shaft 8 then being rotated in the direction of the arrow B in FIG. 1.

In the event of a damage or other trouble caused in the hydraulic circuit of the fluid power steering gear, whereby the motor vehicle must be steered solely by the manually applied force at the steering wheel, the key 20 secured to the steering nut 11 comes into contact with either one of the shoulders 22 and 23 of the keyway 21 of the piston 3 upon rotation of the steering shaft 8. The piston 3 thus solidly engaged with the steering nut 11 is made to move either rightward or leftward in FIG. 1 through the recirculating balls 15, thereby turning the gear sector 6 either clockwise or counterclockwise in the drawing and hence causing the motor vehicle to make a desired turn.

Although a preferred form of the fluid power steering gear of the present invention has been shown and described in the foregoing, it is understood that the invention itself is not to be restricted thereby but to be interpreted broadly and in a manner consistent with the spirit and scope of the invention.

We claim:

1. A fluid power steering gear comprising, in combination, a cylinder, a hydraulic circuit through which fluid is made to flow by means of a pressure source located outside of said cylinder, a piston installed in said cylinder and defining a pair of opposed chambers therewithin, said piston being operably engaged with an oscillatable member connected to a load, a rotatable member confined in said piston and operably connected to a shaft extending into said cylinder, said shaft being actuable by manually applied force, and a pair of control valve means also installed in said piston and having inner sleeve members received by stationary outer sleeve members so as to be displaced in opposite directions therein by actuating means operating through said rotatable member to actuate said control valve means when said shaft rotates for respectively and interrelatedly controlling fluid flow to and from said chambers in said hydraulic circuit.

2. A fluid power steering gear as claimed in claim 1 in which said actuating means comprises pins secured eccentrically to the end face of said rotatable member.

3. A fluid power steering gear as claimed in claim 2, in which the rotational resistance of said rotatable member is regulatable by means of a threaded member screwed into said piston.

4. A fluid power steering gear comprising, in combination, a cylinder having an inlet and an outlet for fluid fed through a hydraulic circuit by means of a pressure source located outside of said cylinder, a piston installed in said cylinder and defining a pair of opposed chambers therewithin, said piston having rack teeth on part of the body thereof which are in mesh with teeth formed on an oscillatable member connected to a load, a rotatable member confined in said piston and operably connected via a plurality of endlessly recirculating balls to a shaft extending into said cylinder, said shaft being actuable by manually applied force, and a pair of control valve means also installed in said piston and arranged in parallel with each other in a plane extending perpendicularly with respect to the axis of said shaft, said control valve means having inner sleeve members received by stationary outer sleeve members so as to be axially displaced in opposite directions therein by means of pins secured eccentrically to the end of said rotatable member, whereby fluid flow to and from said chambers in said hydraulic circuit is interrelatedly controlled.

5. In a fluid power steering gear, a hydraulic circuit comprising, in combination, a source of pressure fluid, a connector from said source of pressure fluid into a cylinder in which is housed said fluid power steering gear, said connector being in open communication with an axial groove formed on the periphery of a piston installed in said cylinder, said axial groove extending over a length substantially equal to the stroke of said piston, and a first and a second control valve means installed transversely in said piston and having radial ports respectively in open communication with said axial groove via passages bifurcated from said axial groove, each of said first and said second control valve means having a stationary outer sleeve member in which is slidably installed an inner sleeve member having a first and a second land, said inner sleeve members of said first and said second control valve means being normally kept in a centered position thereby to permit fluid flow throughout said hydraulic circuit, each of said first and said second control valve means further comprising first, second, third and fourth annular chambers between said outer sleeve member and said inner sleeve member, said first annular chambers of said first and said second control valve means being respectively in open communication with said radial ports, said second annular chambers being respectively normally in communication with said first annular chambers on one hand and being respectively in open communication with a pair of chambers defined by said piston within said cylinder on the other hand, one of said second annular chambers being closed from the corresponding one of said first annular chambers by the corresponding one of said first lands of said inner sleeve members upon simultaneous operation of said inner sleeve members, and said third annular chambers being respectively normally in communication with said second annular chambers on one hand and being in open communication with a reservoir located outside of said cylinder via said connector on the other hand, one of said third annular chambers being closed from the corresponding one of said second annular chambers by the corresponding one of said second lands of said inner sleeve members upon simultaneous operation of said inner sleeve members.

6. A hydraulic circuit as claimed in claim 5, in which said inner sleeve members of said first and said second control valve means are normally maintained at their respective centered position by means of elastic members accommodated respectively in said fourth annular chambers of said first and second control valve means.

7. A fluid power steering gear as claimed in claim 1 in which a safety device comprising a key projecting from said rotatable member and received with allowance in a keyway cut axial on an internal surface of said piston.

8. A hydraulic circuit as claimed in claim 5 in which there are provided communication means between said reservoir and said third annular chamber, said communication means comprising, essentially, a passage 56 formed between the piston 3 and the steering shaft 8 and three passages 57, 58, and 59 formed within the steering shaft.

* * * * *